(12) United States Patent
Suzuki (10) Patent No.: US 7,360,995 B2
(45) Date of Patent: Apr. 22, 2008

(54) VERTICAL AXIS WINDMILL

(75) Inventor: Masahiko Suzuki, Hamamatsu (JP)

(73) Assignees: Global Energy Co., Ltd. (JP); Kabushiki Kaisha FJC (JP)

( * ) Notice: Subject to any disclaimer, the term of this patent is extended or adjusted under 35 U.S.C. 154(b) by 0 days.

(21) Appl. No.: 10/576,960

(22) PCT Filed: Oct. 21, 2004

(86) PCT No.: PCT/JP2004/015597

§ 371 (c)(1),
(2), (4) Date: May 24, 2006

(87) PCT Pub. No.: WO2005/038251

PCT Pub. Date: Apr. 28, 2005

(65) Prior Publication Data

US 2007/0071604 A1    Mar. 29, 2007

(30) Foreign Application Priority Data

| Oct. 22, 2003 | (JP) | ............................. 2003-362284 |
| Dec. 10, 2003 | (JP) | ............................. 2003-412043 |
| Dec. 26, 2003 | (JP) | ............................. 2003-433854 |
| Jan. 26, 2004 | (JP) | ............................. 2004-016436 |
| Jun. 30, 2004 | (JP) | ............................. 2004-194381 |
| Oct. 20, 2004 | (JP) | ............................. 2004-305014 |

(51) Int. Cl.
*F03D 3/06* (2006.01)

(52) U.S. Cl. .................. 416/211; 416/175; 416/200 R; 416/201 A; 416/203; 416/210 R; 416/223 R; 416/228; 416/237; 416/DIG. 2

(58) Field of Classification Search ............ 416/210 R, 416/210 A, 211, 200 R, 200 A, 201 R, 201 A, 416/175, 203, 191, 223 R, 228, 235, 236 R, 416/236 A, 237, 197 A, DIG. 2; 415/4.2, 415/4.4, 907
See application file for complete search history.

(56) References Cited

U.S. PATENT DOCUMENTS

| 2,224,851 | A | * | 12/1940 | Lea | ........................ 416/200 A |
| 4,065,225 | A | * | 12/1977 | Allison | ................... 416/200 A |
| 4,255,085 | A | * | 3/1981 | Evans | .................... 416/197 A |
| 4,264,279 | A | * | 4/1981 | Dereng | ................... 416/197 A |
| 4,362,469 | A | * | 12/1982 | van Holten | ................. 416/191 |
| 4,530,644 | A | * | 7/1985 | Van Holten | ................. 416/175 |

FOREIGN PATENT DOCUMENTS

| JP | 53-113940 | | 9/1978 |
| JP | 57-146066 | A * | 9/1982 |
| JP | 63-154865 | A * | 6/1988 |
| JP | 2000-234582 | A | 8/2000 |
| JP | 2002-235656 | A * | 8/2002 |

(Continued)

*Primary Examiner*—Christopher Verdier
(74) *Attorney, Agent, or Firm*—Ostrolenk, Faber, Gerb & Soffen, LLP (57) ABSTRACT

A vertical axis windmill in which a support frame is provided as a wind power dam to form a plurality of shaft-installation sections, and in which a plurality of vertically long blades each of which has a tilted part at the upper and lower ends respectively are disposed in multi-levels to improve wind-receiving power thereby providing a wind power generator with low installation cost and increased total power generation per a certain area.

1 Claim, 11 Drawing Sheets

FOREIGN PATENT DOCUMENTS

| | | | |
|---|---|---|---|
| JP | 2003-21045 A | * | 1/2003 |
| JP | 2003-120510 | | 4/2003 |
| JP | 2003-148323 | | 5/2003 |
| JP | 2003-278638 | | 10/2003 |
| JP | 2004-204801 A | * | 7/2004 |
| SU | 591606 A | * | 2/1978 |

* cited by examiner

VERTICAL AXIS WINDMILL

CROSS REFERENCE TO RELATED APPLICATION

The present application is a 35 U.S.C. §§ 371 national phase conversion of PCT/JP2004/015597, filed 21 Oct. 2004, which claims priority of Japanese Patent Application No. 2003-362284, filed 22 Oct. 2003, Japanese Patent Application No. 2003-412043 filed 10 Dec. 2003, Japanese Patent Application No. 2003-433854 filed 26 Dec. 2003, Japanese Patent Application No. 2004-016436 filed 26 Jan. 2004, Japanese Patent Application No. 2004-194381 filed 30 Jun. 2004 and Japanese Patent Application No. 2004-305014 filed 20 Oct. 2004. The PCT International Application was published in the Japanese language.

BACKGROUND OF THE INVENTION

The present invention relates to a vertical axis windmill and especially to a vertical axis windmill which makes it possible to form a number of shaft-installation sections with support frames in which a plurality of blades are mounted in multi-levels on a vertical main shaft to increase a wind receiving rate thereby providing an increased wind receiving area and revolution efficiency with low installation cost and a lot of total electric power generation amount per a certain area.

A known vertical axis windmill for a wind power generator comprises a plurality of vertical blades around a vertical main shaft. However, when one of the blades is subjected to wind, the other is subjected to turbulence and to decreased turning force, so that low torque makes it impossible for such a vertical axis windmill to be used practically. The vertical axis windmill revolves at high speed even at gentle wind, but reduced number of blades causes smaller wind-receiving area, while increased number of blades is likely to produce turbulence under high speed wind.

SUMMARY OF THE INVENTION

In view of the disadvantages, it is an object of the present invention to provide a vertical axis windmill suitable for a wind power generator and greatly increasing wind-receiving area with respect to an installation area of the windmill to make the windmill small-sized and lightened thereby reducing cost.

BRIEF DESCRIPTION OF THE DRAWINGS

The above and other features and advantages of the invention will become more apparent from the following description with respect to embodiments as shown in appended drawings wherein.

DETAILED DESCRIPTION OF PREFERRED EMBODIMENTS

Embodiments of the present invention will be described with respect to the drawings.

Figure 1:
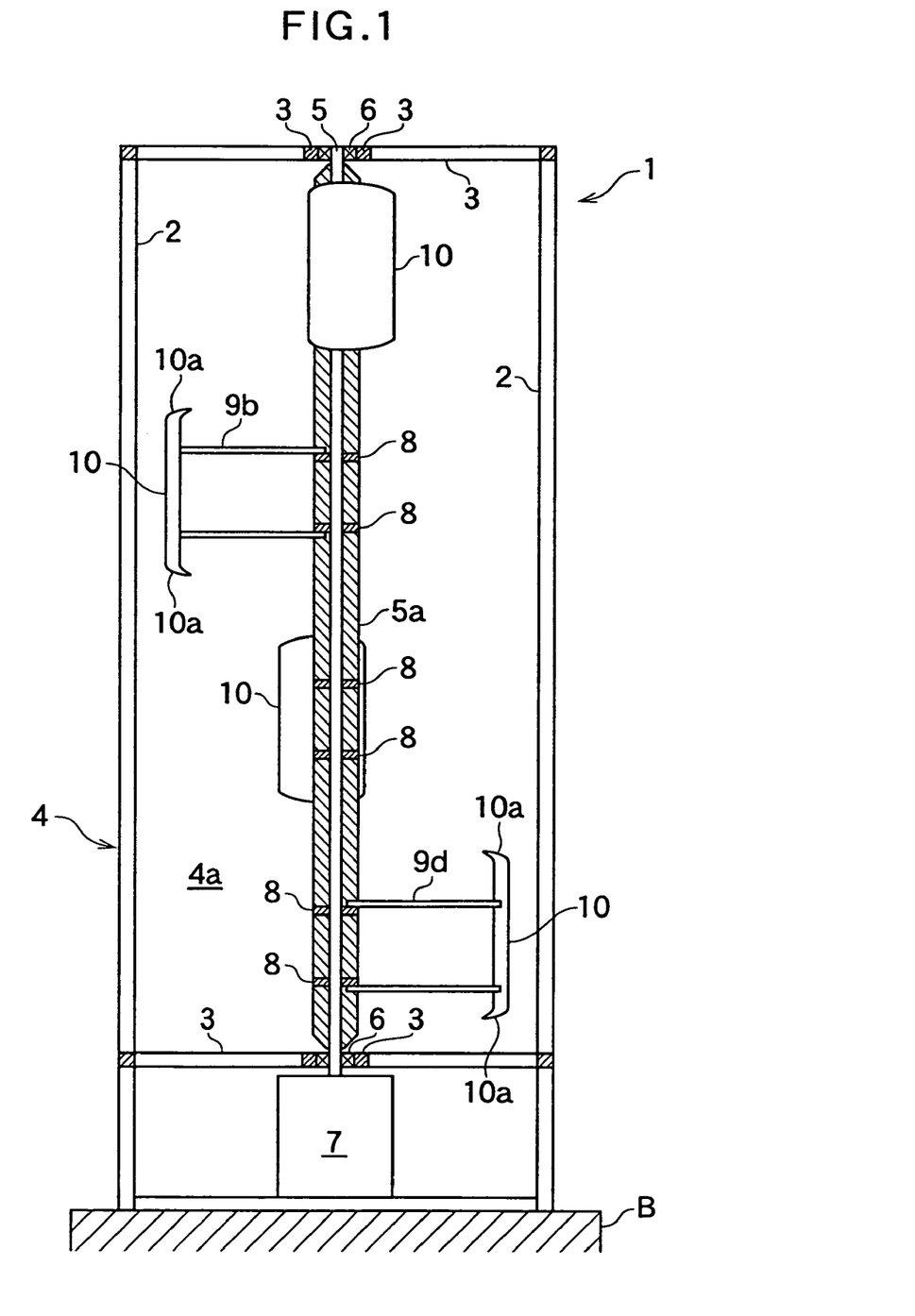
FIG. 1 is a front elevational view of the first embodiment of a vertical axis windmill according to the present invention.
Figure 2:
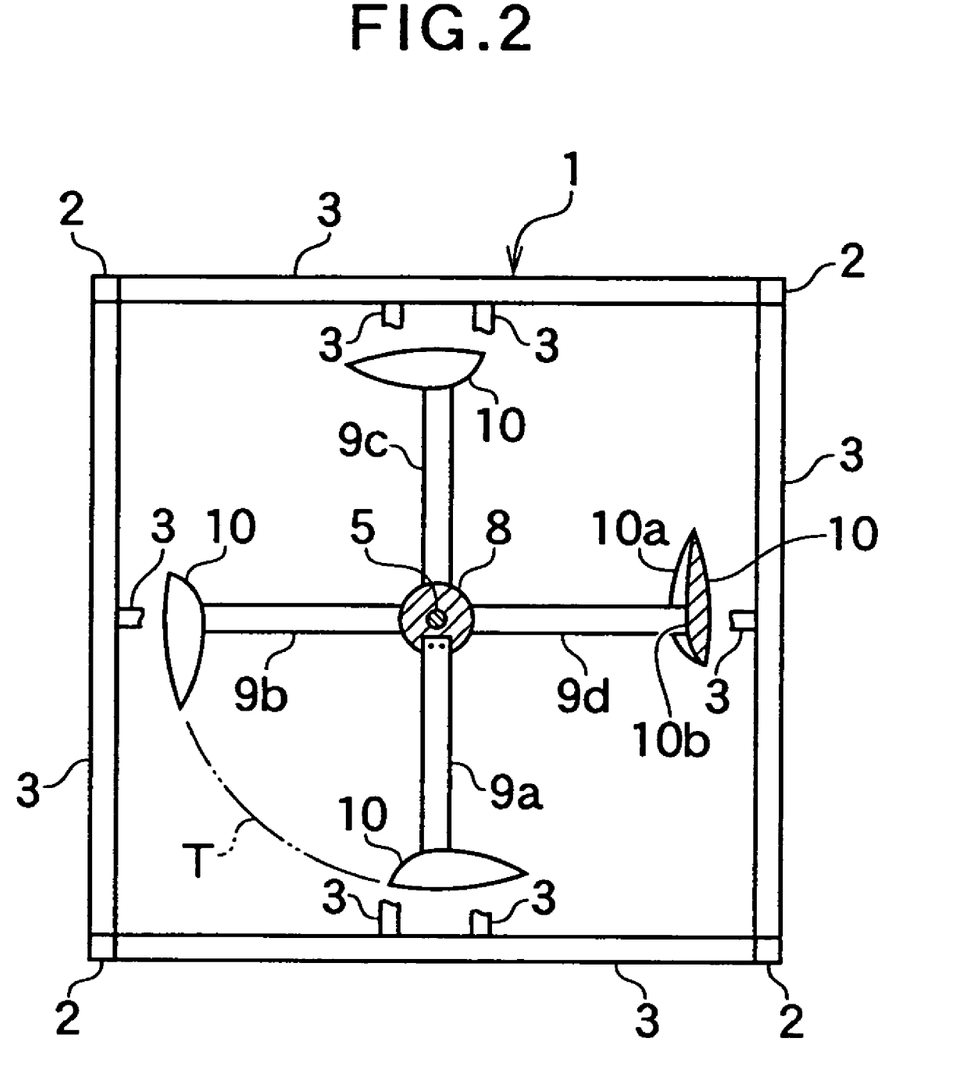
FIG. 2 is a top plan view of the same.

FIG. 1 is a front elevational view of the first embodiment of a vertical axis windmill and FIG. 2 is a top plan view of blades of the vertical axis windmill. In a support frame 4, intermediate fixing arms and diagonal braces are not shown. The support frame 4 is fixed on a concrete foundation "B".

In FIG. 1, the vertical axis windmill 1 has a shaft-installation section 4a in the rectangular support frame 4 comprising a plurality of posts 2 and fixing arms 3.

A vertical shaft 5 of the shaft-installation section 4a is vertically disposed and rotatably supported by upper and lower bearings 6. The post 2 includes a tube, an L-like member, an H-like member, and a U-like member. A plurality of short units may be connected.

A base 7 in FIG. 1 comprises a box in which a bearing (not shown) supports the lower end of the vertical main shaft 5. In the base 7, a generator (not shown) may be provided to the vertical main shaft 5 via transmitting means to allow the whole support frame 4 to play a role of a wind power generator.

In FIG. 1, the vertical main shaft 5 is, for example, 7 m high and the outer surface thereof is covered with a reinforcement member 5a except the vicinity of the bearings. The reinforcement member 5a is made of FRP, Al material or combination thereof.

In the reinforcement member 5a, fixing members 8 are covered to improve weather resistance of support arms 9a-9d. The connection of molds of the reinforcement members 5 is filled with FRP resin and hardened, so that the molds can be connected.

A plurality of fixing members 8 are fixed on the vertical main shaft 5. The fixing member 8 is annular and slidable onto the vertical main shaft 5. The fixing member 8 may comprise two halves which press onto the shaft 5 and are fixed with screws. The fixing members 8 may be used as flywheels for maintaining turning inertia of the windmill.

A pair of upper and lower fixing members 8 are spaced equally as four sets in FIG. 1. On each one pair of the fixing members 8, the upper and lower support arms 9 are disposed in parallel vertically and are fixed to the fixing members 8 with screws. A vertical distance between the upper and lower support arms 9 is determined by height of the blade 10. If there are three support arms 9 spaced vertically, there are three fixing members 8 spaced vertically as a single set.

Directions of the support arms differ every one set. As shown in FIG. 2, the uppermost support arm 9a extends forwards, while the second-level support arm 9b extends at right angles thereto.

The third-level support arm 9c extends at further right angles, while the fourth support arm 9d extends at further right angles therefrom. The turning direction may be clockwise or anticlockwise.

The total angle from the uppermost support arm 9a to the lowermost support arm 9d is 360 degrees and as shown in FIG. 2, each of the support arms 9a-9d being equally spaced at a right angle.

In FIG. 1, at the outer ends of each set of the support arms 9a-9d, a vertical blade 10 is fixed with the inner surface opposing the vertical main shaft 5. The support arms 9a-9d are fixed to the blades 10 with screws, bonding or FRP fixing depending on size and weight of the blade 10.

The support arms 9 have a rigidity sufficient to support the blades 10 and shapes configured to not involve wind resistance. The support arms 9a-9d are made of, for example, FRP plates.

For example, the blade is 100-180 cm high and 4-6 cm thick. Chord length varies depending on orbital radius and the number of the blades. Chord length of a single blade is determined within the range of 50-65% of the radius.

The upper and lower ends of the blade 10 are inclined to form tilted parts 10a. If the angle of the tilted part 10a is more than 45 degrees, turbulence of wind is likely to occur, while if it is too small, retrieving rate of wind power decreases. Thus, suitable angle is 30-45 degrees. If the tilted part 10a is too long, it is likely to become resistant and may be preferably less than 10% of the length of the blade.

When the blade 10 is revolved, air revolves with the side surface of the blade 10 due to viscosity of fluid. As a result, wind that enters the revolution track of the blade 10 flows in a vertical direction to have smaller resistance on the surface of the blade. When the tilted parts 10a are formed inwards on the upper and lower ends of the blade 10, air flow that intends to flow up and down is suppressed by the tilted parts 10a to increase air pressure thereby pushing the blade 10 in a direction of revolution. Therefore turning efficiency of the blade 10 having the tilted parts 10a increases by 10-40% compared with a blade having no tilted part, as described later.

In the blade 10 according to the present invention, chord length or width is enlarged. Since the tilted parts 10a are formed on the upper and lower ends of the blade 10, it is confirmed that the blade 10 achieves ideal revolution number compared with a simple straight vertical blade in spite of large chord length.

Figure 3A:
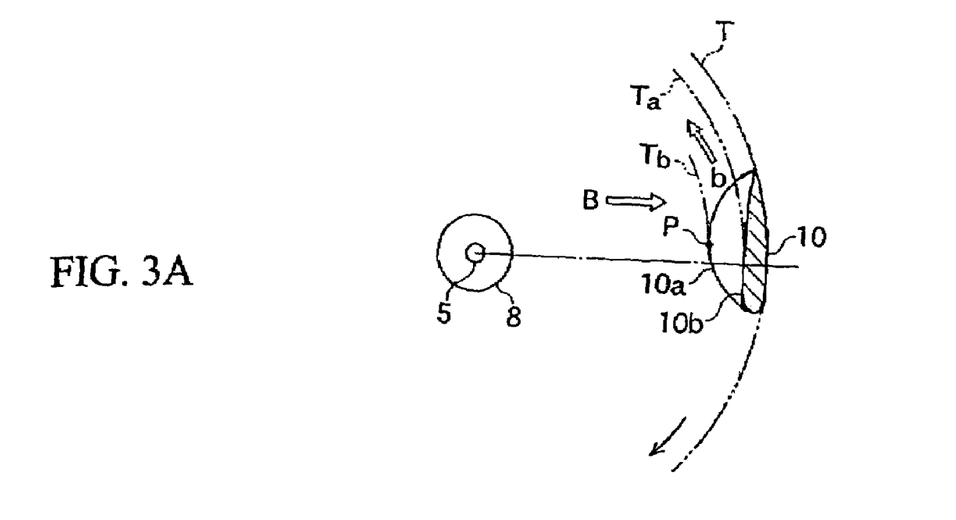
FIG. 3a is a top plan showing a blade in this invention.
Figure 3B:
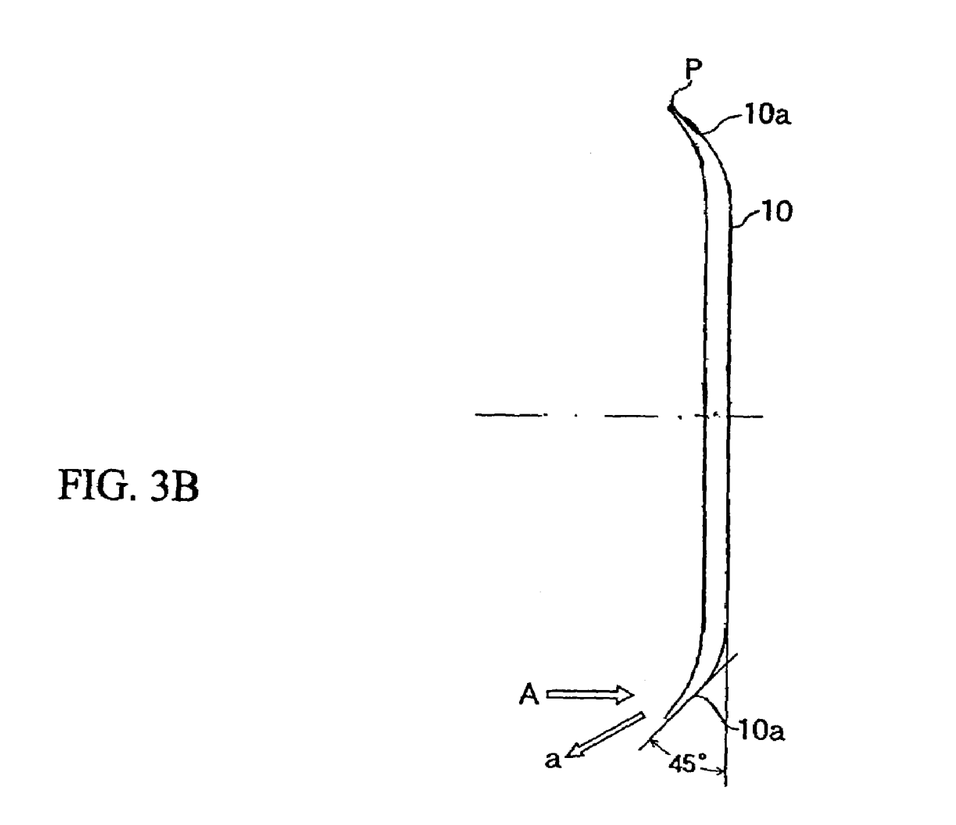
FIG. 3b is a front view of the same.

FIG. 3a is a schematic view of a top plan view of the blades and FIG. 3b is a front view of the same.

The outer surface of the blade 10 comprises a curved surface along a revolution track "T". Therefore, during rotation of the vertical axis windmill 1, the outer surface of the blade 10 moves along the curved surface of the revolution to reduce lost resistance of wind at a centrifugal part of the blade.

A lobe 10b is formed on the inner surface of the blade 10. Thus, during revolution, the rear end of the inner surface of the blade 10 is revolved outside a revolution track "Ta" of the lobe 10b, and accordingly, wind which flows along the inner surface of the blade 10 rearwards flows outside the revolution track "Ta" of the lobe 10b.

Thus, when the head wind hits the front surface of the blade 10 in FIG. 3, it pushes the rear end of the inner surface of the blade 10.

Because the lobe 10b is formed on the inner surface of the blade 10, wind which flows along the outer surface of the blade 10 is faster than wind which flows along the inner surface. Faster wind makes air thinner generating a negative pressure, so that the blade 10 is pressed inwards and forwards from the outside to create thrust and to give self-turning force.

In FIGS. 3a and 3b, wind which hits the inner surface of the turning blade 10 from the left front and flows vertically hits the tilted part 10a of the blade 10. Since the turning track "Tb" is inside the turning track "Ta" of the lobe 10b, the wind current which passes rearwards over the lobe 10b does not diffuse up and down, but passes rearwards at high speed while it is pressed by the upper and lower tilted parts 10a to create high pressure thereby pushing the rear of the inner surface of the blade 10 and becoming the turning force.

In a front view of FIG. 3b, an arrow "A" which hits the left side surface of the tilted part 10a is repulsive in a direction of an arrow "a". In a top plan view of FIG. 3a, wind of an arrow "B" is repulsive in a direction of an arrow "b". The repulsive wind affects turning force of the blade as reaction.

In FIGS. 3a and 3b, the chord length of the blade 10 is set to 50% of a orbital radius of the blade. However, the outer surface of the blade 10 is set to a circular surface along the turning track "T". So in spite of the lobe 10b formed on the inner surface, the blade 10 has a thickness of about 7% of the turning radius. The thinner the blade, the smaller the turning resistance.

In the vertical axis windmill 1, as constructed above, the blade 10 is 1 m long. Four single blade levels a single blade are disposed around the vertical main shaft of 5-7 m, so that the four blade vertical axis windmill has broad wind-receiving area and provides high torque during revolution.

In each level, the blade 10 is the single blade in order to achieve no wind resistance on the in opposite side of the same level to increase revolution efficiency. Against wind which varies in direction instantly, the blades 10 in each level vary in their angular direction by right angles to enable the shaft to turn smoothly with continuous wind power like a four cylinder engine of an automobile and achieve strong torque.

The single blade 10 is disposed on the single main vertical shaft 5 in each of a plurality of levels by fixed angles to provide good turning balance of the vertical main shaft.

In multi-level blades around the single main vertical shaft 5, the power coefficient is not equal to a multiplier of the number of levels, but is more than that, which is confirmed. Lift of four-level blades is four times larger than that of a single blade, but a resistant load to the blade 10 decreases to one divided by the number of levels to increase turning efficiency and to increase turning speed of the blade 10, thereby increasing the power coefficient.

In the first embodiment, the blades 10 are disposed in four levels, but three vertical main shafts 3 may be connected vertically to provide twelve levels of the blades 10.

By shortening the vertical main shaft 5, the blades 10 may be disposed in three or six levels. The blade 10 may be longer or shorter.

Figure 4:
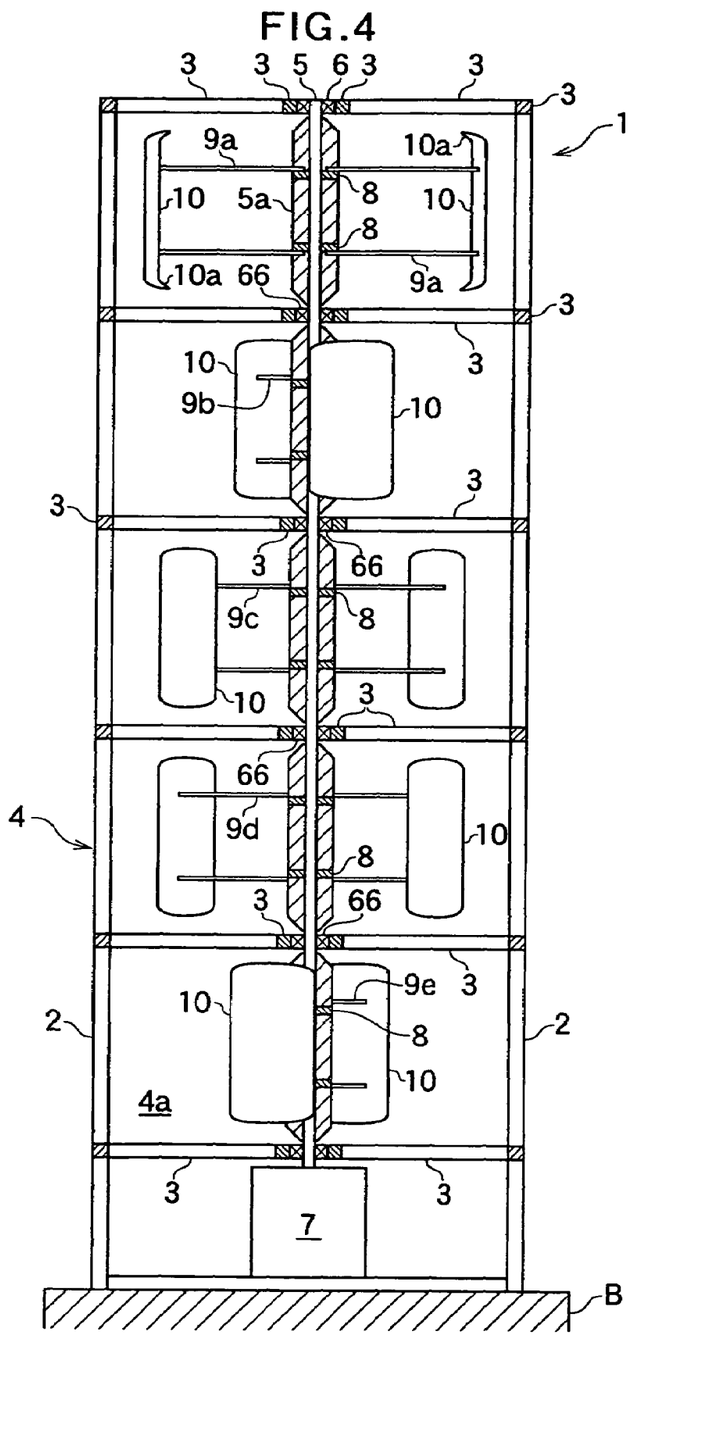
FIG. 4 is a front elevational view of the second embodiment of a vertical axis windmill according to the present invention.
Figure 5:
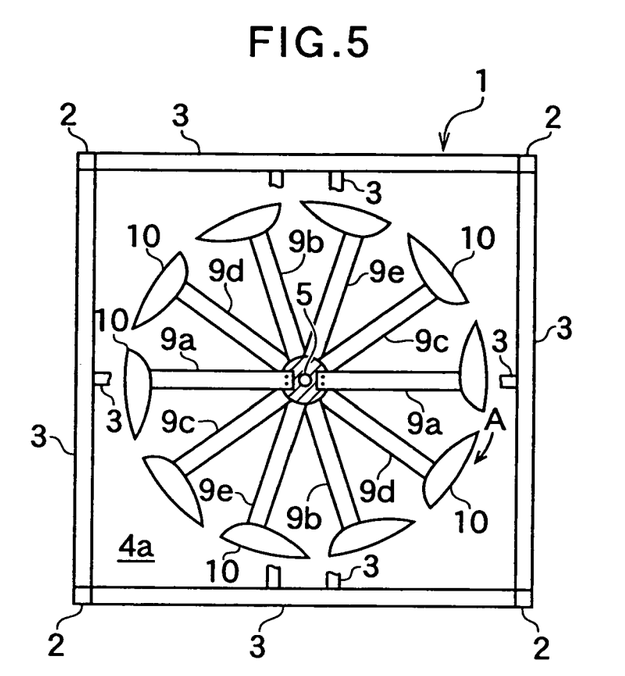
FIG. 5 is a top plan view of the second embodiment of a vertical axis windmill according to the present invention.

FIG. 4 is a front elevational view of the second embodiment of a vertical axis windmill of the present invention, and FIG. 5 is a top plan view. The same numerals are given to the same members as above and description thereof is omitted. Intermediate fixing arms or diagonal braces are omitted in a support frame in FIGS. 4 and 5.

In FIG. 4, a vertical main shaft 5 is supported by a plurality of intermediate bearings 66, each of which is fixed by a fixing arm 3 between posts 2. Thus, the vertical main shaft 5 can resist flexing as a whole, rendering the metal vertical main shaft 5 thinner and lighter so far as it endures shearing load.

In FIG. 4, the vertical main shaft 5 is put between the two blades 10. If orbital radius of the blade 10 is 1 m, the chord length of the blade 10 may be preferably set to 40 to 55% of the radius.

Support arms 9a-9e are placed on the same orbit. During turning, the two blades 10 in the same level have good balance to improve balance of revolution in the whole windmill 1.

As shown in FIG. 5, the uppermost support arms 9a are disposed at each side of the shaft 5. The second-level support arm 9b is shifted at an angle of 72 degrees in a direction of revolution as shown by an arrow "A". The third-level support arm 9a is further shifted by 72 degrees. The fourth- and fifth-level support arms 9d,9e are shifted by 72 degrees in the direction of revolution.

Thus, the support arms 9a-9e are arranged in the direction of revolution separated by 36 degrees in the order of 9a,9d,9b,9e,9c,9a,9d,9c as shown in FIG. 5.

In the second embodiment, the two blades are arranged in five levels to bring the total number of the blades to ten to increase the wind-receiving area to cause stronger torque. Specifically, the wind-receiving area of five levels of the windmill 1 is more than five times greater than a single-level windmill, and wind power generation increases in proportion to the area of the blade 10 multiplied by wind speed and cubed.

Figure 6:
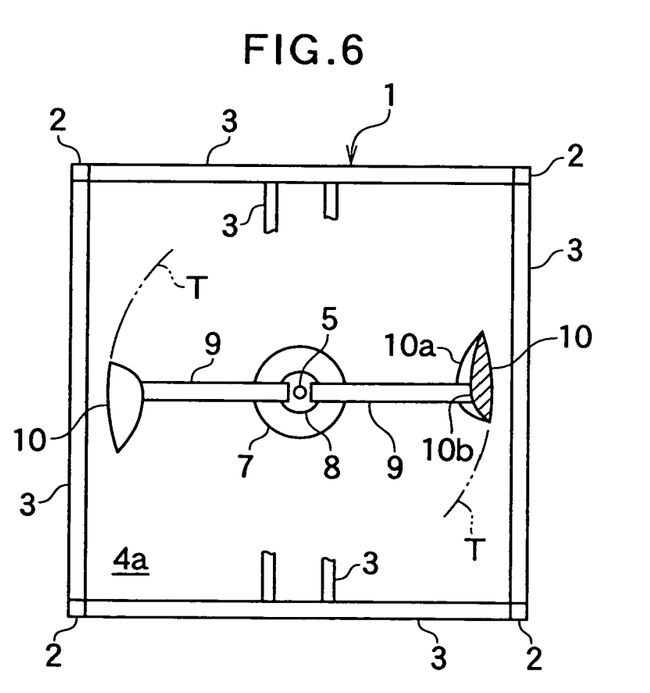
FIG. 6 is a top plan view showing the shape of a blade of a vertical axis windmill.

FIG. 6 is a top plan view of two blades of a vertical axis windmill. The same numerals are allotted to the same parts and members and description thereof is omitted.

The vertical axis windmill 1 is manufactured for wind tunnel tests, and a radius of orbit of blades 10 is 40 cm; height is 80 cm and chord length is 20 cm.

The outer surface of the blade 10 moves along an orbit of revolution "T". A lobe 10b is formed inside the blade 10 and tilted parts 10a are formed in the upper and lower ends of the blade 10.

Wind tunnel tests are carried out on revolution performance of the windmill 1.

Date: Jul. 26, 2004, cloudy, 32-34 deg. C.

Wind tunnel device owned by Ashikaga Institute of Technology

Opening type, Blowing port: 1.04 m×1.04 m, variable speed wind tunnel

Wind speed measurement: Betz-type manometer and piteau tube

Tested wind speed: 4, 6, 8, 1, 12, 14 m/s

Straight blade: 13, 16, 20, 23 cm as chord length

BELLSHION-type blade: only 20 cm as chord length.

Torque test: Inverter-motor type device owned by Ushiyama graduate course of Ashikaga Institute of Technology In wind tunnel tests about a straight blade having no tilted parts, the following results of windmill efficiency "Cp" are obtained.

From the test results, the blade of chord length of 23 cm is excellent in windmill efficiency "Cp" when wind speed is high such as 14 m/s, but is poor when wind speed is low such as 4 m/s.

In contrast, the blade of chord length of 20 cm or 50% of orbital radius provides windmill efficiency of 0.17 in spite of low wind speed of 4 m/s which is greatly excellent compared with the others.

On BELLSHION type blades having tilted parts at the upper and lower ends and chord length of 20 cm, wind tunnel tests were carried out and the results are as below:

| Chord length | Wind speed | Cp | Wind speed | Cp |
|---|---|---|---|---|
| 13 cm | 4 m/s | 0.06 | 14 m/s | 0.26 |
| 16 | 4 | 0.05 | 14 | 0.27 |
| 20 | 4 | 0.17 | 14 | 0.28 |
| 23 | 4 | 0.10 | 14 | 0.29 |

| Chord length | Wind speed | Cp |
|---|---|---|
| 20 cm | 4 m/s | 0.25 |
|  | 8 | 0.27 |
|  | 12 | 0.30 |
|  | 14 | 0.32 |

From the wind tunnel test results, compared the blade 10 according to the present invention with an ordinary straight blade, the blade 10 according to the present invention has chord length 20 cm corresponding to 50% of orbital radius, but provides over 0.25 of windmill efficiency "Cp" at low wind speed of 4 m/s compared with windmill efficiency 0.17 of the straight blade having chord length of 20 cm at wind speed of 4 m/s which proves good efficiency.

Specifically, in case of the same chord length, the blade 10 of the present invention achieves better efficiency by 47% at low wind speed of 4 m/s and by 14% at high wind speed of 14 m/s than straight blades.

The numerical values of the tests show that the vertical axis windmill 1 has a small difference of revolution efficiency from low speed wind area to high speed wind area and is stable.

In particular, a wind power generator is not profitable unless wind of more than 4 m/s blows for over 2000 hours year. In each region where there are a lot of days in which high speed wind does not blow throughout a year, the vertical axis windmill 1, having Cp=0.25 at wind speed of 4 m/s of this invention, is suitable for generating wind power.

In the wind tunnel tests, it is confirmed that windmill efficiency "Cp" is poor especially at low speed area whether the cord length of the blade 10 is shorter or longer than width corresponding to 50% of orbital radius. Thus, it is confirmed that the chord length of the blade 10 in two blades may preferably range from 45% to 55%. However, depending on size, blades number, average wind speed of the place, etc., the chord length may be 40 to 60% of the orbital radius.

Figure 7:
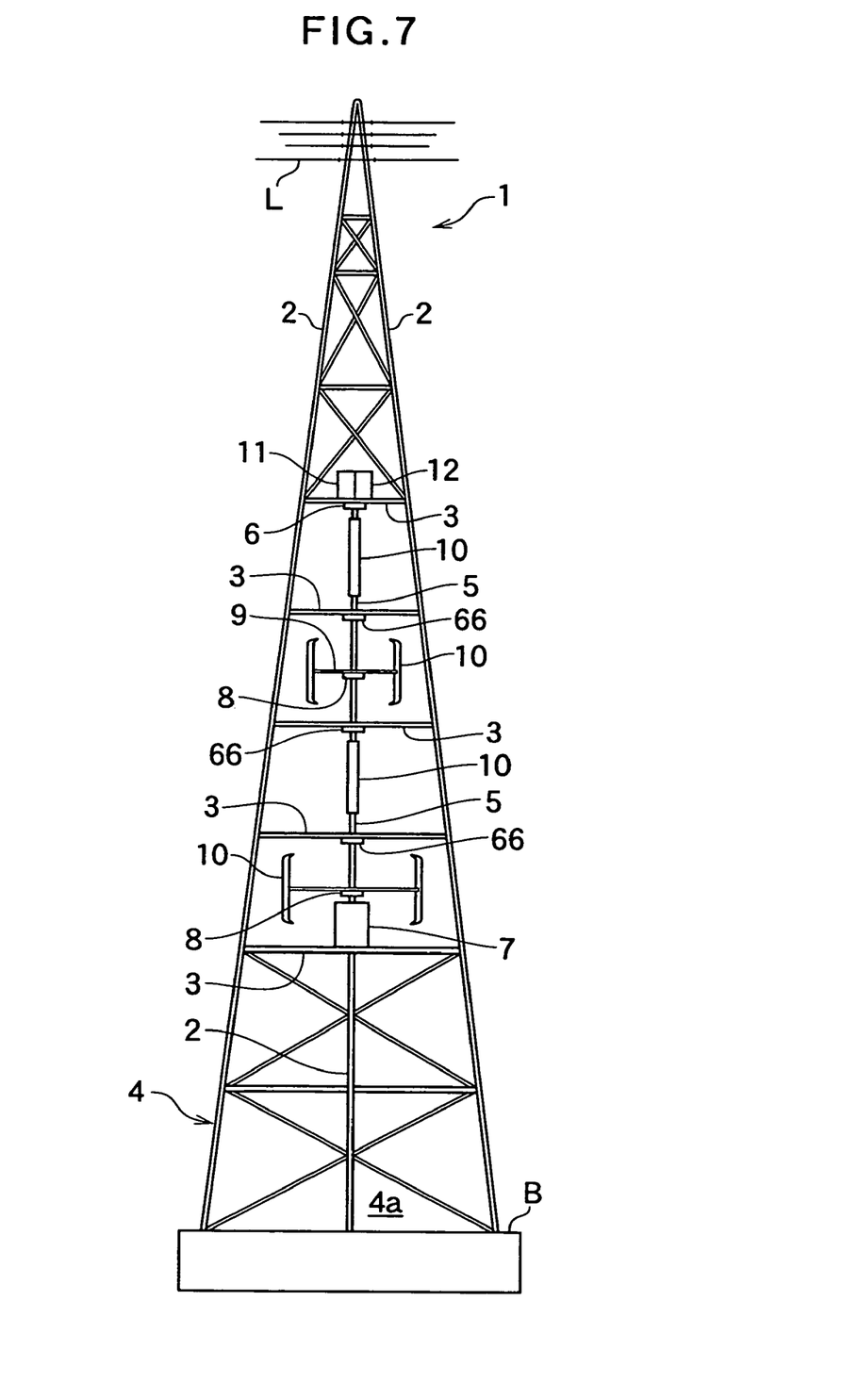
FIG. 7 is a front elevational view of the third embodiment of a vertical axis windmill according to the present invention.

FIG. 7 is a front elevational view of the third embodiment of a vertical axis windmill according to the present invention. The same numerals are allotted to the same members as those in the foregoing embodiments and description thereof is omitted. Intermediate fixing arms and diagonal braces are not shown in a support frame 4 in FIG. 7.

In the vertical axis windmill 1 in the third embodiment, an existing steel tower "L" for high voltage power line is used as it is. Electricity generated by a power generator (not shown) in a base 7 is gathered into an electricity collector 11, transformed by a transformer 12 and collected via the power line "L". Thus, capital investment is saved and power generation in remote areas and power collection are facilitated. As shown, orbital radius of a blade 10 is variable depending on each vertical level.

Figure 8:
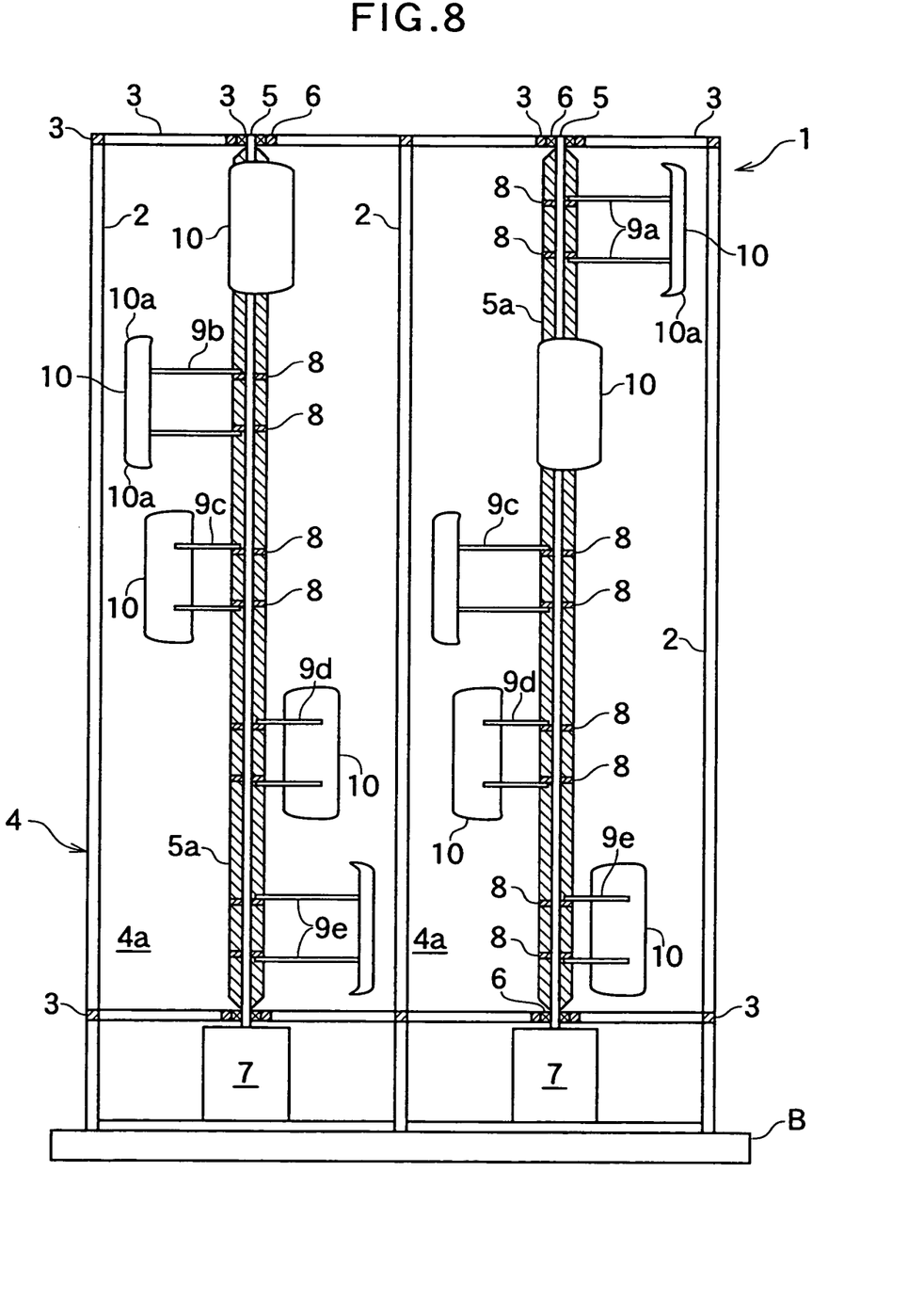
FIG. 8 is a front elevational view of the fourth embodiment of a vertical axis windmill according to the present invention.

FIG. 8 is a front elevational view of the fourth embodiment of a vertical axis windmill according to the present invention. The same numerals are allotted to the same members as those in the foregoing embodiments and description thereof is omitted. Intermediate fixing arms or diagonal braces are not shown in a support frame in FIG. 8. An electricity collector, a transformer, an automatic control device, a turning speed sensor or brake means are not shown.

In the fourth embodiment, a plurality of shaft-installation sections are provided horizontally in a support frame 4, and a vertical main shaft 5 are disposed in each of the shaft-installation sections 4a, so that a plurality of vertical main shaft 5 is disposed in the single support frame 4. FIG. 8 shows two sections, but ten or twelve sections may be disposed continuously in a horizontal direction.

A plurality of shaft-installation sections 4a are formed in the single support frame 4, and the vertical main shaft 10 is disposed in each of the shaft-installation sections 4a. A plurality of blades 10 are mounted to each of the vertical main shafts 5, but the adjacent blades 10 are different in direction to enable the wind flow to pass through smoothly, thereby reducing interaction of air flow caused by the adjacent blades during revolution.

The vertical main shafts 5 in the fourth embodiment thus constructed allow the whole support frame 4 to act as a wind power generator. As a result, each of the vertical main shafts 5 enables a generator (not shown) in a base 7 to rotate and generate electric power which is collected to realize a high volume generator by the single support frame 4.

Blades 10 in this embodiment may comprise two blades in FIG. 4. As shown in FIG. 4, the vertical main shaft 5 may be supported by, the intermediate bearings 66.

The shaft-installation sections 4a are continuously arranged side by side and the number of levels of the blades 10 may be varied such as five, four and three levels. This is suitable when it is installed on uneven grounds.

Figure 9:
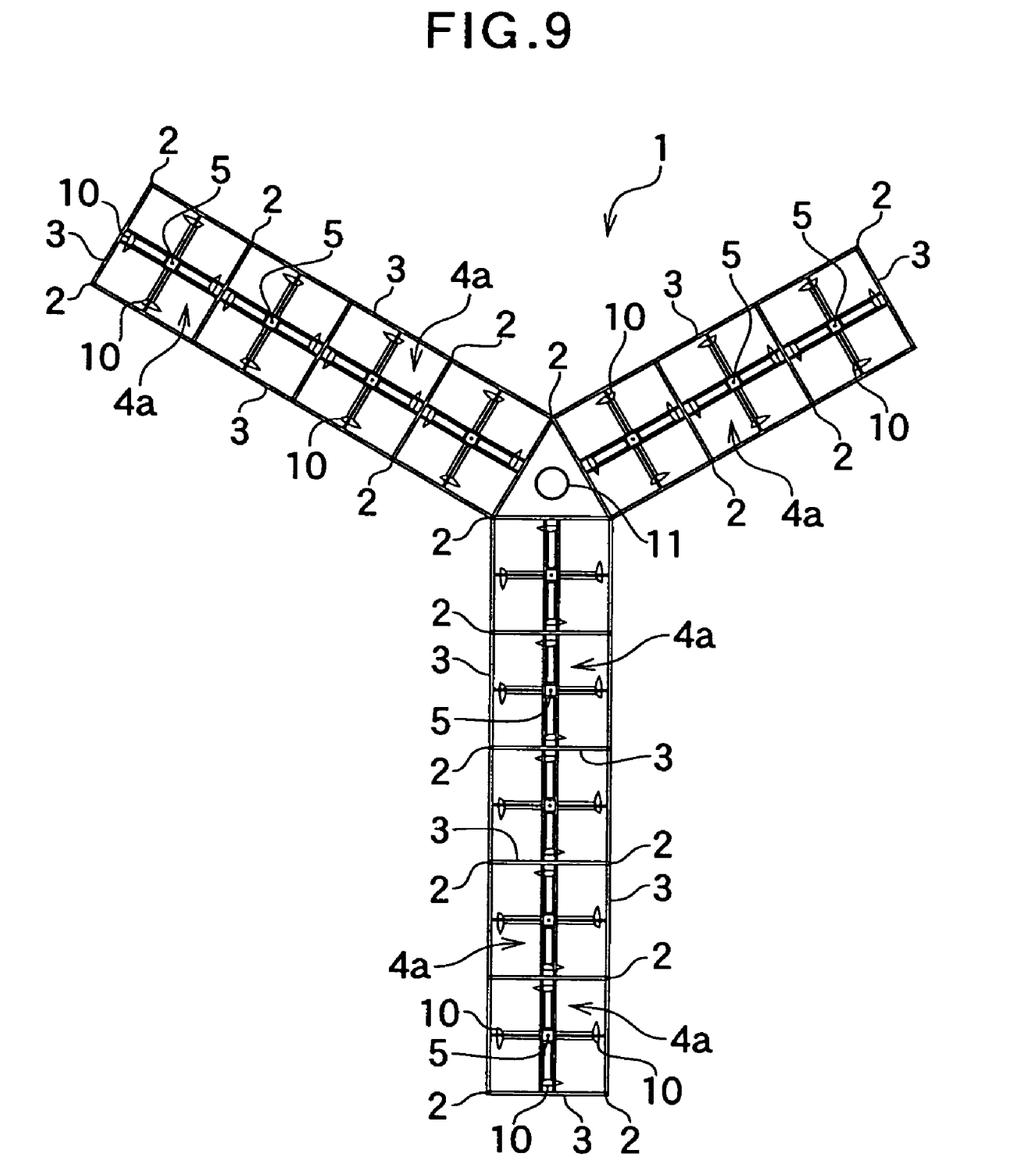
FIG. 9 is a top plan view of the fifth embodiment of a vertical axis windmill according to the present invention.

FIG. 9 is a top plan view of the fifth embodiment of a vertical axis windmill according to the present invention. The same numerals are allotted to the same members as those in the foregoing embodiments and description thereof is omitted. Intermediate fixing arms or diagonal braces are not shown in a support frame 4 in FIG. 9.

The vertical axis windmill 1 in the fifth embodiment comprises the support frame 4 of a Y-shape. Twelve shaft-installation sections 4a are shown, but may be continuous ten or fifty sections in one direction. Depending on landform, the number of the sections 4a increases to become longer in one direction, but decreases to become shorter in the other direction. Also, in one direction, the shaft-installation sections 4a can be moved back and forth.

Figure 10:
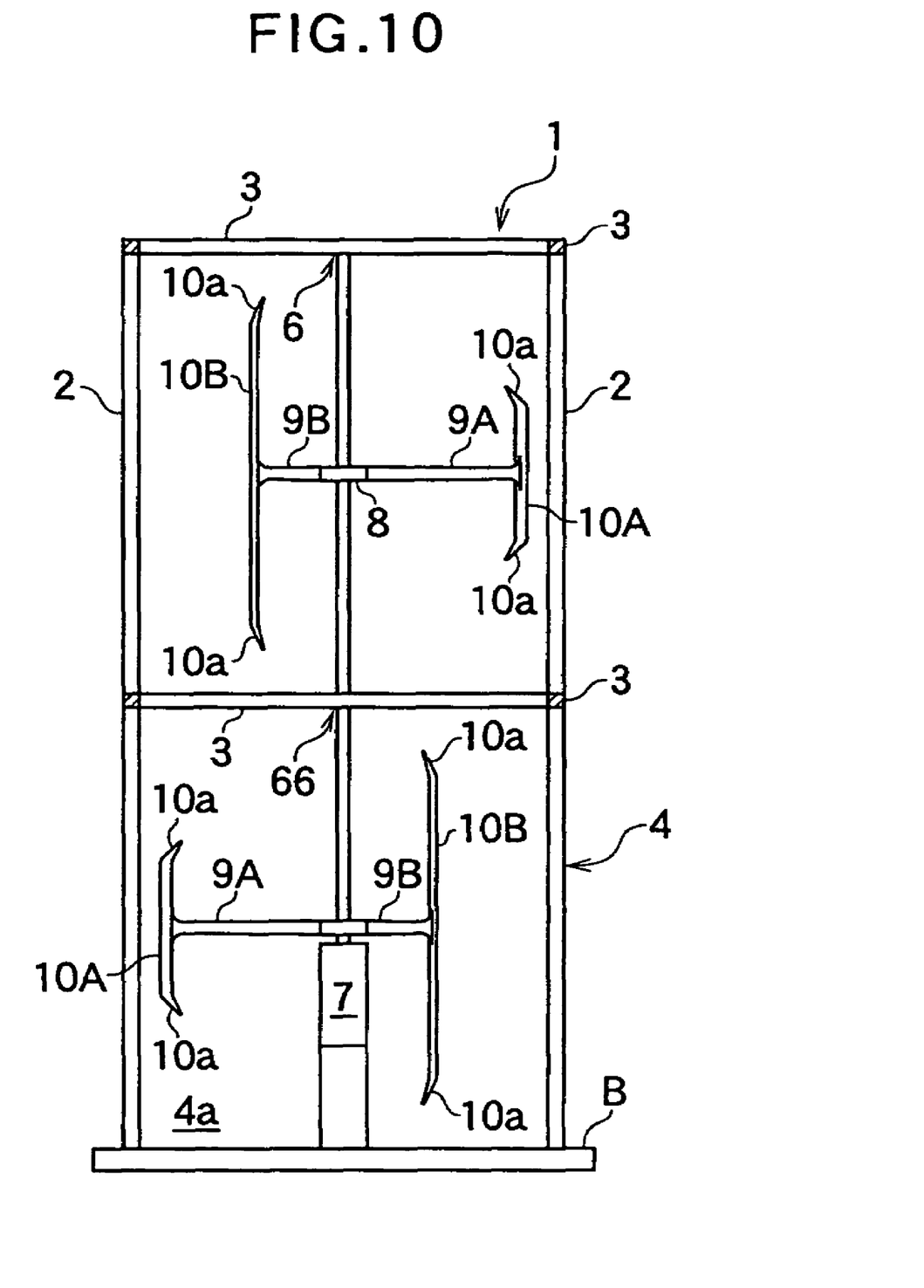
FIG. 10 is a front elevational view of the sixth embodiment of a vertical axis windmill according to the present invention.

FIG. 10 is a front elevational view of the sixth embodiment of a vertical axis shaft. The same numerals are allotted to the same members and description thereof is omitted. In a support frame in FIG. 10, intermediate fixing arms and diagonal braces are not shown.

In the sixth embodiment, support arms 9 for blades 10 are different from each other in length, and a farther blade 10A and a nearer blade 10B are provided. The ratio of a longer support arm 9A to a shorter support arm 9B is 2:1 at maximum. In FIG. 10, the farther blades 10A and the nearer blades 10B are arranged in two levels and the longer and shorter support arms 9A,9B are disposed straight. In case of four levels, the longer and shorter support arms 9A,9B are spaced at right angles.

In FIG. 10, the farther blade 10A is shorter, while the nearer blade 10B is longer. The ratio of the shorter support arm 9B to the longer support arm 9A is 1:2. The longer support arm 9A is 100 cm long and the shorter support arm 9B is 50 cm long. The farther blade 10A is 100 cm long and the nearer blade 10B is 200 cm long, so that wind-receiving areas are the same.

The farther blade 10A and the nearer blade 10B do not pass through the same turning track during revolution and are unlikely to be subjected to turbulence by revolution. These embodiments are greater in wind-receiving area than a single blade per level embodiments, so that advantage achieved by a single blade is added to the advantage of two blades.

Figure 11:
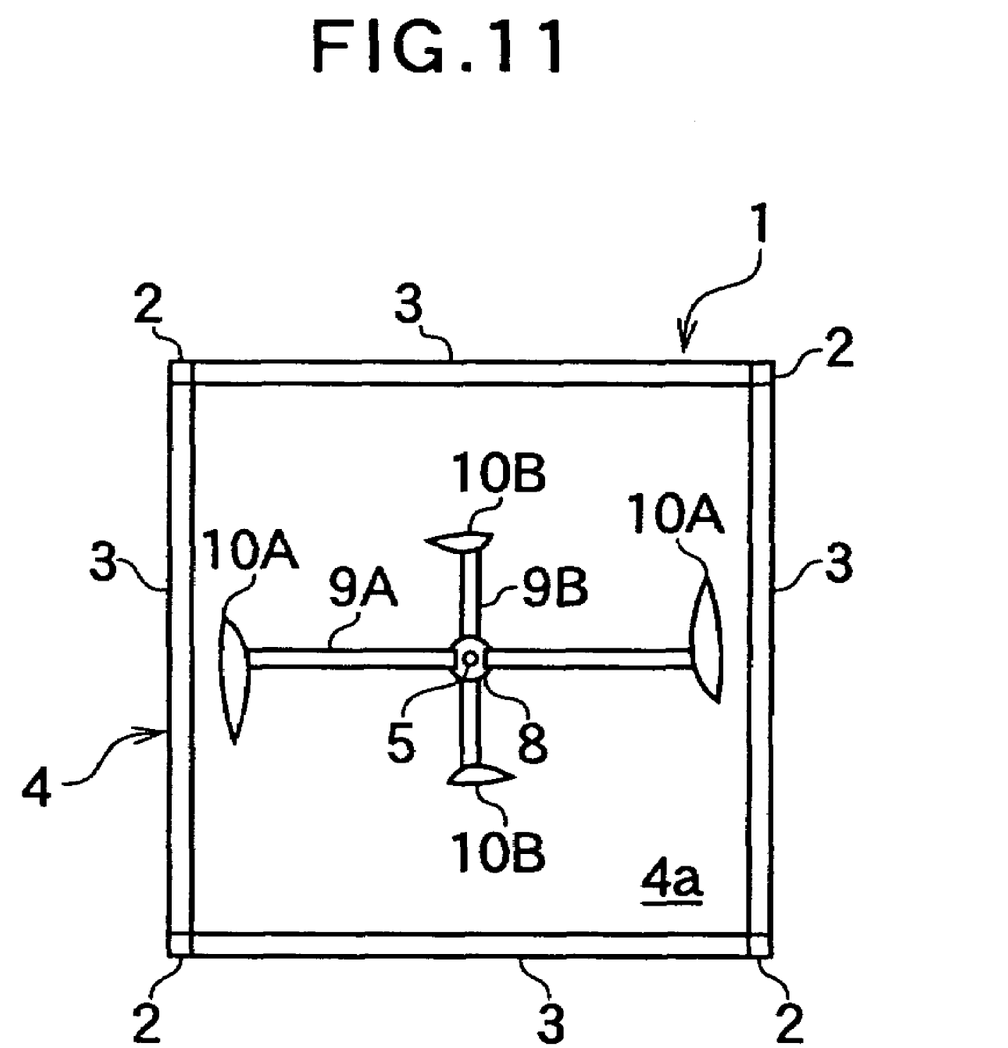
FIG. 11 is a top plan view of the seventh embodiment of a vertical axis windmill according to the present invention.

FIG. 11 is a top plan view of the seventh embodiment of a vertical axis windmill according to the present invention. The same numerals are allotted to the same members and description thereof is omitted. In a support frame 4 in FIG. 11, fixing arms or diagonal braces are not shown.

In the seventh embodiment, a longer support arm 9A is disposed across a shorter support arm 9B, and two farther blades 10A and two nearer blades 10B are mounted to the longer support arm 9A and the shorter support arm 9B, respectively. In FIG. 11, the support arm 9A for the farther blades 10A are mounted on the upper surface of a fixing member 8, while the support arm 9B for the two nearer blades 10B are mounted on the lower surface of the fixing member 8. However, the longer and shorter support arms 9a and 9B may be both mounted on the upper surface of the fixing member 8. The blades 10 may be disposed to a single vertical main shaft 5 in a plurality of levels similar to the other embodiments.

Figure 12:
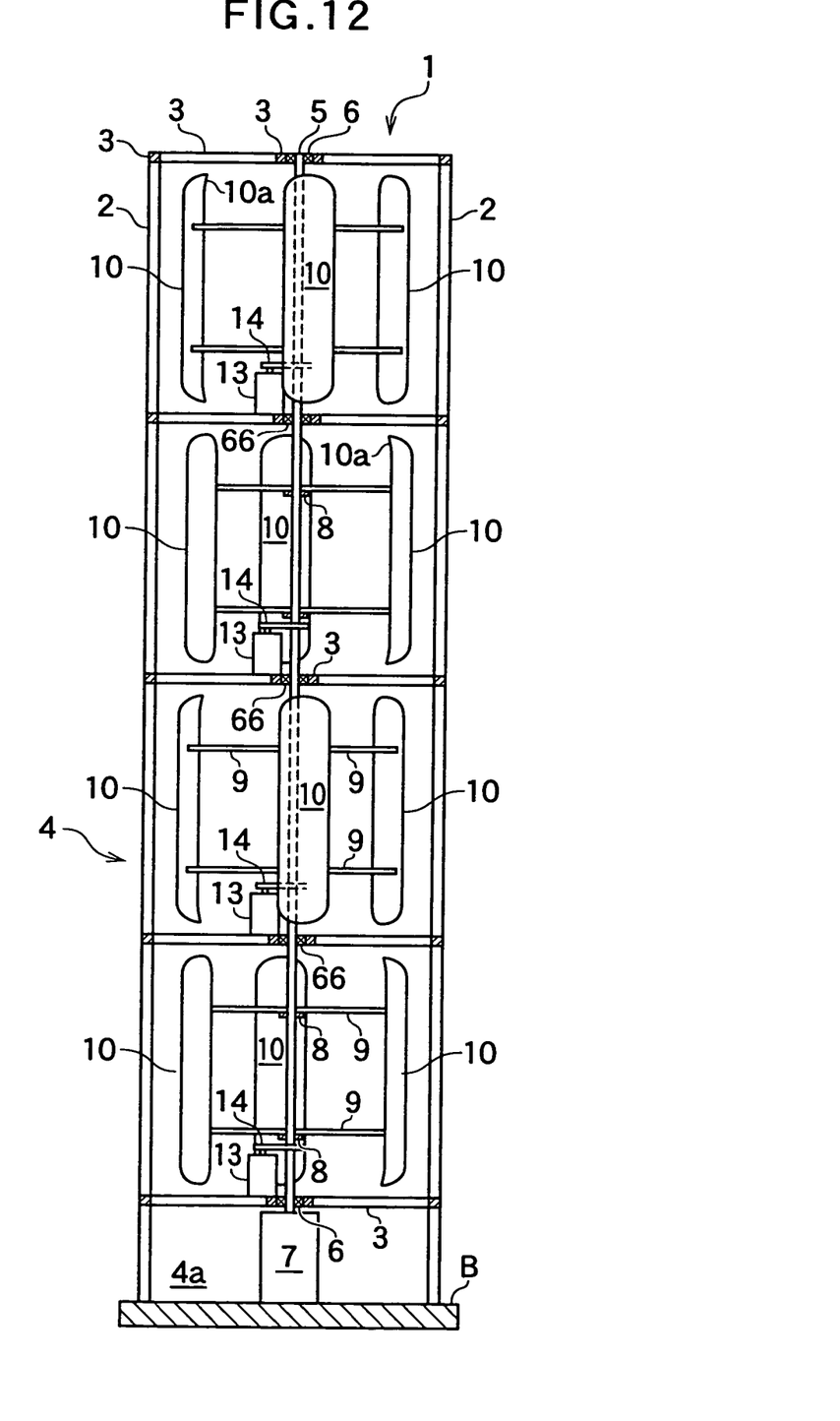
FIG. 12 is a front elevational view of the eighth embodiment of a vertical axis windmill according to the present invention.

FIG. 12 is a front elevational view of the eighth embodiment of a vertical axis windmill according to the present invention. The same numerals are allotted to the same members as those in the foregoing embodiments and description thereof is omitted. In FIG. 12, intermediate fixing arms or diagonal braces are not shown.

In the eight embodiments, three blades are arranged in four levels. The chord length of a blade 10 may be preferably 40-45% of orbital radius, smaller than that of two blades. The blades 10 are distanced from those in next level by 30 or 60 degrees. A power generator 13 is disposed in each level to generate electric energy by rotation of a vertical main shaft 5 via transmitting means 14. An automatic clutch device or automatic load switch (not shown) is disposed in each of the generators 13. A bearing, a transmission, a turning speed sensor, an automatic control device, an automatic brake and a rotation-assisting motor (not shown) are provided.

The rotation speed sensor detects rotation speed of the vertical main shaft 5 to control relevant equipment by the automatic control device based on the detected value. Wind speed of less than 4 m/s actuates the automatic clutch device to open and close at every level of certain wind speed. Thus, the automatic clutch device is opened in the four generators 13 to allow the number of generators 13 to which turning force of the vertical main shaft 5 are not transmitted to be one to three, thereby realizing rotation of the vertical main shaft with load which matches low wind speed to carry out power generation suitable with low wind speed.

In starting at low wind speed, only one of the generators 13 connected to the vertical main shaft 5 is started and the connected generators 13 are increased in number with increase of wind speed. Therefore, only one generator smaller than the others in power generation volume can be installed.

During calm, the rotation assisting motor (not shown) is driven by the automatic control device to give starting force to the windmill 1. During typhoon, the automatic brake is actuated. The automatic brake may be an electric loading device, not a mechanical device. The automatic loading switching device may be an opening/closing switch device for a plurality of batteries and an electromagnetic coil. For example, when typhoon exceeds a certain wind speed, the switch opens by the automatic control device based on detected value in an amemometer to become load which makes it impossible to generate power by the wind speed, so that the windmill is braked.

With respect to control of the automatic load switch in the generator 13 in this embodiment, another embodiment may be applied.

A power generator is connected to a vertical main shaft of a windmill to make a wind power generator. A support frame is made of light posts to extend in a horizontal direction thereby increasing height, preventing collapse and producing a high volume wind power generator comprising a number of small windmills.

The forgoing merely relates to embodiments of the invention. Various modifications and changes may be made by a person skilled in the art without departing from the scope of claims wherein:

What is claimed is:

1. A vertical axis windmill comprising:

a support frame;

a vertical main shaft rotatably mounted to the support frame;

a support arm having a first end and a second end, the first end of the support arm being mounted to the vertical main shaft; and a vertically elongated blade mounted to the second end of the support arm, the vertically elongated blade having an upper tilted end and a lower tilted end, each of the tilted ends gradually tapering in a vertical direction along the vertical main shaft and inclining inwardly towards the vertical main shaft at an angle of 30-45 degrees with respect to a vertical axis of the vertical main shaft, wherein a chord length of the vertically elongated blade is 45-55% of a radius of revolution of the blade.

* * * * *